United States Patent
Schindler et al.

(10) Patent No.: US 10,501,052 B2
(45) Date of Patent: *Dec. 10, 2019

(54) ASSEMBLY MODULE FOR A MOTOR VEHICLE WITH AN OPTICAL SENSOR SYSTEM FOR MONITORING A DETECTION REGION

(71) Applicant: Huf Hülsbeck & Fürst GmbH & Co. KG, Velbert (DE)

(72) Inventors: Mirko Schindler, Velbert (DE); Helmut Schumacher, Coesfeld (DE); Norbert Heller, Grefrath (DE); Oliver Müller, Velbert (DE); Bernd Ette, Wolfsburg (DE); Nadine Sticherling, Essen (DE); Alexander Ziegler, Wülfrath (DE); Jean Malabo Yomkil, Essen (DE); Stefan Mönig, Schwelm (DE); Iko Lindic, Essen (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/115,472

(22) PCT Filed: Jan. 7, 2015

(86) PCT No.: PCT/DE2015/100004
§ 371 (c)(1),
(2) Date: Jul. 29, 2016

(87) PCT Pub. No.: WO2015/113550
PCT Pub. Date: Aug. 6, 2015

(65) Prior Publication Data
US 2017/0166165 A1  Jun. 15, 2017

(30) Foreign Application Priority Data
Jan. 31, 2014  (DE) .................. 10 2014 101 206

(51) Int. Cl.
*G08B 21/00* (2006.01)
*B60R 25/24* (2013.01)
(Continued)

(52) U.S. Cl.
CPC .......... *B60R 25/24* (2013.01); *B60R 25/2081* (2013.01); *G01S 13/08* (2013.01); *G01S 15/08* (2013.01); *G01S 17/10* (2013.01)

(58) Field of Classification Search
CPC .................. B60R 25/24; G07C 9/00309; G07C 9/00182; G07C 2009/00984
(Continued)

(56) References Cited

U.S. PATENT DOCUMENTS

2005/0046584 A1* 3/2005 Breed .................. B60C 11/24
340/13.31
2008/0296926 A1* 12/2008 Hanzel ............... B60R 25/2054
296/146.1

(Continued)

FOREIGN PATENT DOCUMENTS

CN  101519935 A  9/2009
CN  102658804 A  9/2012

(Continued)

OTHER PUBLICATIONS

Notification of the First Office Action for Chinese application No. 201580006697.6 dated Feb. 27, 2018, with an English translation, 14 pages.

(Continued)

*Primary Examiner* — Mark S Rushing
(74) *Attorney, Agent, or Firm* — Rudy J. Ng; Bret E. Field; Bozicevic, Field & Francis LLP (57) ABSTRACT

The invention relates to an assembly module (20) for a motor vehicle (1), comprising an optical sensor system (30) which can be used a) to monitor a detection area (150) on the (Continued)

outside of the motor vehicle (1) in order to determine the proximity of a user (10), b) to measure the distance to the user (10) within the detection area (150) and c) to release a signal for carrying out an action on the motor vehicle (1) in the event a user (10) is detected in a predefined actuation area (180) within the detection area (150).

26 Claims, 7 Drawing Sheets

(51) Int. Cl.
 G01S 17/10 (2006.01)
 G01S 13/08 (2006.01)
 G01S 15/08 (2006.01)
 B60R 25/20 (2013.01)
(58) Field of Classification Search
 USPC .......................................................... 340/5.64
 See application file for complete search history.

(56) References Cited

U.S. PATENT DOCUMENTS

| | | | | |
|---|---|---|---|---|
| 2010/0214112 | A1* | 8/2010 | Ishihara | B60R 25/246 340/686.1 |
| 2013/0200995 | A1* | 8/2013 | Muramatsu | E05F 15/73 340/5.51 |
| 2014/0330486 | A1* | 11/2014 | Gehin | B60R 25/2054 701/49 |

FOREIGN PATENT DOCUMENTS

| | | |
|---|---|---|
| CN | 202854922 U | 4/2013 |
| CN | 103514439 A | 1/2014 |
| DE | 102005032402 B3 | 9/2006 |
| DE | 102008021989 A1 | 12/2008 |
| DE | 102007050094 A1 | 4/2009 |
| DE | 102009023594 A1 | 12/2010 |
| DE | 102010056171 A1 | 6/2012 |
| DE | 102011115760 A1 | 4/2013 |
| JP | H4-249785 A | 9/1992 |
| JP | H04249785 A | 9/1992 |
| JP | H7-43469 A | 2/1995 |
| JP | H07043469 A | 2/1995 |
| JP | 2006328932 A | 12/2006 |
| JP | 2009-14445 A | 1/2009 |
| JP | 2009014445 A | 1/2009 |
| JP | 2012501435 A | 1/2012 |
| JP | 2013-7171 A | 1/2013 |
| JP | 2013007171 A | 1/2013 |
| WO | WO2013037806 A1 | 3/2013 |

OTHER PUBLICATIONS

Notice of Reasons for Rejection dated Aug. 7, 2018, for related Japanese Application No. 2016-567128, with an English translation, 7 pages.

\* cited by examiner

ASSEMBLY MODULE FOR A MOTOR VEHICLE WITH AN OPTICAL SENSOR SYSTEM FOR MONITORING A DETECTION REGION

The invention relates to an assembly module for a motor vehicle and a method for triggering a signal for carrying out an action on a motor vehicle.

It is known that in vehicle an ambient light monitoring can be carried out to perform actions in the vehicle. For example, so-called "keyless entry" and "keyless go" functions are used in vehicles. In this case, it is identified, for example, by means of radio monitoring, when a corresponding radio key, e.g. in the trouser pocket of a user, is located in the vicinity of the vehicle. Then, an authentication can be carried out as an action in which the agreement of the key with the vehicle can be determined by means of interrogation. Then the vehicle can be opened or closed. Other methods of monitoring, e.g. in a capacitive manner, are known. Thus, for example it is possible to determine the intervention of the user with his hand in a door handle by means of capacitive sensors. This can also trigger an action, e.g. the authentication of the user by means of his radio key carried on the body.

A disadvantage with known solutions is that these always require an active triggering or an active start. Thus, for example, the authentication is only triggered by the capacitive sensor if the user actually reaches for the vehicle handle. The same applies to the automatic opening of the tailgate which only opens when the user has an appropriate sufficient proximity to the vehicle and a corresponding sensor system. In addition, known methods are not sufficiently sensitive so that fundamentally there is a risk of a misinterpretation of a gesture or a user.

It is the object of the invention to at least partially eliminate the previously described disadvantages. In particular, it is the object of the present invention to reduce or completely avoid in a cost-effective and simple manner any risk of an incorrect triggering of a corresponding signal to carry out an action on the motor vehicle.

The preceding object is solved by an assembly module having the features of claim 1 and a method having the features described herein. Further features and details of the invention are obtained from the subclaims, the description and the drawings. In this case, features and details which are described in connection with the assembly module according to the invention naturally also apply in connection with the method according to the invention and in each case conversely, so that in relation to the disclosure reference is always made or can be made to the individual inventive aspects alternately.

An assembly module according to the invention for a motor vehicle is fitted with an optical sensor system which is suitable
  a) for monitoring a detection region lying outside the motor vehicle in order to determine the proximity of a user,
  b) for measuring the distance to the user within the detection region and
  c) in the case of identifying the user in a predefined actuation region within the detection region, triggering a signal for performing an action on the motor vehicle.

According to the invention, the detection region is further subdivided into a smaller actuation region. Thus, two stages of identification of the user are possible. On the one hand, the approach of the user is determined by permanent monitoring of the detection region. Within the detection region a more accurate monitoring can now take place which in particular is only performed selectively when a user has been identified in the detection region.

This measurement of distance to the user now brings additional information to a usually two-dimensional monitoring of the detection region, in particular in a third dimension. The measurement of distance to the user therefore allows, starting from a two-dimensional detection region, so to speak a volume of the actuation region to be monitored in a third dimension. It can thus be ensured that, for example, small elements underneath the actuation region, i.e. between the actuation region and the ground surface or body parts of the user above the actuation region no longer lead to triggering of the signal. This results in particular in a cost-effective and simple reduction of the risk of incorrect triggerings.

Naturally, most diverse technical solutions can be used as distance measurement as will be explained subsequently. A particularly preferred solution for the distance measurement is the use of the so-called "time of flight" determination with the emission of one or more pulsed laser light flashes and the receipt of the reflection of this or these laser light flashes. Naturally however the present invention is not restricted to this technical solution but can on the contrary have various technical design forms.

According to the invention, it is now possible to configure at least the actuation region, preferably also the detection region, as a volume element. The volume elements of the actuation region or the detection region can be arranged on the ground surface or float above this ground surface.

This allows a more targeted triggering of the signal for carrying out the action on the vehicle. In particular, for example, the volume element can have a small height above the ground surface so that exclusively the foot or only the tip of the user's foot is capable of being identified as an object inside the actuation region. Only in such a case is the corresponding signal triggered to perform the action on the vehicle. Since a distinction between a desired position of the person or the user and a random position of the user can now be distinguished in greater detail and can even be delimited in the third dimension, the risk of an undesired triggering of the signal for performing the action on the motor vehicle is reduced substantially. This results in a significantly higher acceptance and in particular in the avoidance of undesired actions on the motor vehicle.

According to the invention the assembly module may be fastened on the motor vehicle. An optical sensor system is understood as a system which has one or more sensor units. This can perform a monitoring of the detection region in an optical manner. For example, the sensor system can comprise a photosensor which has individual photosensitive pixels. Thus, an image, in particular a two-dimensional image of the detection region can be provided and changes of the individual pixels form the basis for a monitoring for a user entering into the detection region. In other words, it is possible to monitor the detection region purely optically and in particular continuously.

A detection region in the sense of the present invention is a region next to or outside the vehicle which suggests a desired subsequent action by the user with a high probability. For example, such a detection region can be disposed behind the vehicle and indicate an action with reference to the tailgate, e.g. the desire to open the tailgate. It is further possible that a corresponding detection region is formed next to the vehicle, e.g. in the region of the vehicle doors or the rear doors, in particular in the region of a sliding door.

In such a case, the entry of the user into this detection region would with a high probability indicate a wish to actuate the corresponding door.

According to the invention, a distinction may be made between the detection region and the actuation region. The actuation region is located inside the detection region and is preferably configured to be smaller, in particular significantly smaller than the detection region. Thus, a substantially two-stage identification can be assumed. According to the invention, the monitoring of the detection region preferably takes place continuously and therefore uninterruptedly. It can thus be identified if a user enters into the detection region. At this time and preferably also after this time, a monitoring of the smaller actuation region takes place within the detection region. In other words, the optical sensor system according to the invention is in a fundamental monitoring functionality with regard to the detection region. In this case or depending on the entry of the user into the detection region, a laser light flash can be emitted to allow a correlation with the predefined actuation region.

It can be provided that the optical sensor system or the entire assembly module is configured for arrangement on the vehicle rear, e.g. behind the rear window, in a handle strip, in an emblem, in a tail lamp, behind a reflector, on a bumper and/or in a gap between two components. Alternatively or additionally, the assembly module can be suitable for being fastened on a vehicle side, e.g. in a B pillar. By this means different detection regions in which a user approaches the motor vehicle in the usual manner can be monitored with the optical sensor system. In particular, the optical sensor system or the entire assembly module can be concealed behind a layer which is opaque from the outside, which however is transparent to the light of the optical sensor system. Thus, for example, the bumper on which the optical sensor system is mounted can be varnished.

Preferably the optical sensor system is arranged on the motor vehicle in such a manner that it does not get very dirty. For example, the optical sensor system can be arranged behind the rear window in the wiping area of the windscreen wiper or on the handle strip. Alternatively or additionally the assembly module can have a wash nozzle which can clean the optical sensor system. The wash nozzle can thereby automatically clean the optical sensor system whenever the windscreen wiper of the front and/or rear window is actuated. A clean optical sensor system requires a lower light intensity to function so that energy can thus be saved.

The intensity of the emitted light can depend on the brightness of the ambient light. The brightness of the ambient light can be determined by a brightness sensor.

If different user's intentions can be determined when monitoring the actuation region, different user's intentions can be assigned to different gestures. Thus, for example, treading with the foot into the actuation region can cause an opening of the tailgate whilst a lateral movement of a hand near the optical sensor brings about an extension of the trailer coupling.

It is feasible that a removal of the object within a predefined removal duration from the actuation region must take place so that the signal is provided. The removal of an object within a predefined removal duration can be part of the gesture. The beginning of the removal duration is perceptible for the user. Thus, for example, a display element can adopt several illumination states. In one of the illumination states such a display element can emit light having a constant brightness. In another illumination state, for example, the brightness can vary periodically. For example, at the beginning of the actuation duration the display element can emit light having constant brightness. During the removal time the display element can, for example, flash. The signal is only provided when the object, e.g. a body part of the user, is removed from the actuation region within the removal duration.

It may be provided that the assembly module and/or motor vehicle has at least one means which makes it easier for the user to make known the user's intention in the actuation region so that the signal is triggered.

Thus the assembly module can emit an information signal that the actuation duration will end shortly. The information signal can begin, for example, by a change in the illumination state of the display element. The information signal can correspond to a different illumination state of the display element. For example, at the end of the actuation duration the display element can flash. The means corresponds to a corresponding process specification in the monitoring unit.

It may also be helpful for the user for making known his intention if the user is guided to the actuation region. This is particularly the case if the user cannot perceive the actuation region, in particular the end surface of the actuation region on the ground surface as a result of carrying a large item, e.g. a package. For this purpose, the assembly module and/or the motor vehicle can have means which can produce a discernible signal for the user, in particular a visible, audible or perceptible signal. Thus, for example, the assembly module can have lighting elements, e.g. LEDs. The lighting elements can be arranged so that the lighting elements act as way markers. For example, the lighting elements can be aligned in such a manner that they produce markings on the ground surface which lead to the actuation region. Additionally or alternatively the lighting elements can be arranged adjacently to one another. The lighting elements can be switched on in a sequence which shows the user in which direction he must move towards the actuation region. Instead of the lighting elements, lighting elements already provided, which are arranged adjacent to one another in the motor vehicle, e.g. the lighting elements of a headlamp, a brake light, indicators or the like can be used. It is also feasible to give the user an instruction acoustically in which direction the user must move. For this purpose the assembly module can have a loudspeaker. It is also feasible to notify the direction change to the ID transmitter which shows the user the way by various vibrations. If a change in direction is notified to the user, the optical sensor system determines the position of the user and the direction in which he must move to the actuation region, and causes the discernible means to emit the corresponding signal.

It may also be helpful for the user that the position of the actuation region and/or the length of the actuation duration is variable. This is particularly helpful when a physically impaired user would like to make known his user's intention. This is also helpful when the actuation region can be located at an unfavourable position for the user. The unfavourable position can be permanent in this case, for example, the actuation region can end at a trailer coupling. Alternatively the unfavourable position can be unfavourable only for the triggering of a single operating signal, e.g. because the actuation region ends in a puddle. In order to vary the position of the actuation region and/or the length of the actuation duration, in particular a predefined user action can be provided. Thus, the user can vary the position of the actuation region and/or the length of the actuation duration by means of an input in a user menu, e.g. a motor vehicle controller or an ID transmitter. Alternatively the predefined user action can be identified by the optical sensor system. In another alternative the assembly module can be transferred into a learning mode in which the assembly module learns the amended position of the actuation region and/or the amended length of the actuation region.

Likewise, it may be helpful for the user that the actuation region is monitored anew in order to determine a user's intention for triggering a operating signal after a first actuation duration has ended without identifying a user's intention. This is particularly helpful if the user was distracted and had not reached the actuation region in good time or had made the wrong gesture. It can thus be provided that the actuation region can be monitored several times, in particular twice or three times. The renewed monitoring of the actuation region can be initiated automatically. Alternatively a predefined user action can be provided in order to monitor the actuation region again for a further actuation duration. For this purpose, for example, a capacitive sensor can be addressed by the user. Alternatively this can be a predefined user action which is identified by the optical sensor system.

The predefined user action which is identified by the optical sensor system and which instigates a change in the position of the actuation region and/or the actuation duration and/or a renewed monitoring of the actuation region for identifying a user's intention, can for example comprise the following user actions: a predefined gesture within the actuation and/or detection region, for example, a moving to and fro of a body part of the user, a non-removal of a body part if a removal was provided, a movement of the user in the detection and/or actuation region and/or from the detection and/or actuation region. In particular, a body part can be a hand or a foot. It can further be provided that the user leaves the detection region for a predefined time and then returns into the detection region.

If the actuation region is again monitored to determine a user's intention, the display element also displays this. If the position of the actuation region is changed, the display element displays this. For this purpose the display element has a plurality of illuminants, e.g. LEDs. In each case one or a plurality of illuminants make an actuation region at least partially visible in each case. Preferably the actuation region with the changed position lies within the detection region. Depending on which actuation region is monitored, the corresponding pixels are evaluated.

It can be the case that a position of the ID transmitter is checked during or after the authentication and before triggering of the signal. To this end, the intensity of a signal emitted by an ID transmitter can be used. For example, the receive signal strength indicator (RSSI) can be used for this. By determining the intensity of the emitted signal, it can be determined, for example, whether the user is located in front of, next to or behind the motor vehicle. By this means it can be ensured that only the authorized user himself enters into the detection region and has made known his user's intention in the actuation region. It is feasible to interrogate the RSSI cyclically.

It may be advantageous if, in the assembly module according to the invention, the optical sensor system is configured to perform step b) by means of an ultrasound measurement. The already discussed TOF calculation is also possible using ultrasound. Thus, for example, the reflection of the ultrasound can give an indication or a computational determination of the distance between the assembly module and the user or the body part of the user. Thus, the use of ultrasound involves a possible configuration of the optical sensor system. The crucial thing however is that at least the monitoring of the detection region takes place in an optical manner independently of the technical solutions for the monitoring of the actuation region explained further. It is preferred however if all the monitorings, i.e. both steps a) and b) are performed in an optical manner.

It is further advantageous if in the assembly module according to the invention the optical sensor system is configured to perform step b) by means of a radar measurement. A radar measurement is also possible to achieve a corresponding distance information. In particular the assembly module can have a so-called PDC (park distance control) functionality. In this way it is also possible to incorporate already existing sensors provided in the motor vehicle into an optical sensor system of an assembly module according to the invention. Naturally combinations of different technical solutions for the distance measurement according to step b) are also possible within the framework of the assembly module according to the invention.

It may also be advantageous if, in the assembly module according to the invention, the optical sensor module is configured to perform step b) by means of an evaluation of at least two images of the detection region recorded at different angles. In this way, a corresponding distance determination can be made, for example, by phase shift or knowing the angle by means of a computational triangulation matching. This embodiment is an alternative to an optical identification for the laser flash method explained in detail subsequently. This solution can naturally also be combined with other technical embodiments to perform step b) with an assembly module according to the invention.

An assembly module according to the invention for a motor vehicle is preferably configured so that the optical sensor system is configured to execute the two following substeps for step b), namely b1) emitting a laser light flash within the detection region and b2) identifying a reflection of the laser light flash from the user.

According to the invention, in particular the use of a laser light flash is essential for the additional identification of information on the distance to the user. In this case, according to the present invention the laser light flash can now be used to obtain three-dimensional information by identifying its reflection. Whereas the simple optical sensor system is equipped, for example with the aid of a photosensor, the laser light flash can add three-dimension distance information in addition to the two-dimensional information of such a photosensor. It is thus possible to define the detection region or in particular the actuation region with regard to its distance from the vehicle or the assembly module.

By using a laser light flash, it is possible to obtain the described 3D information. For example a so-called "time-of-flight" method (TOF) can be used here. Here the time which has elapsed between the emission of the laser light flash and the receipt of the reflection of the laser light flash is determined. A distance calculation or a distance determination can take place by means of this time difference using a correlation with the speed of light. This has the result that now no longer a fundamental identification of the corresponding user within the detection region or within the actuation region can be made, but this is correlated with the distance information.

In relation to the detection region and the actuation region, the use of a laser light flash according to the invention has the result that these regions no longer can be configured only two-dimensionally as an area outside the vehicle but the detection region and the actuation region can also be configured as detection volume or actuation volume. It should be pointed out here that naturally an extension from the ground as far as the maximum height is possible for the detection region as a volume and also for the actuation region as a volume. However, it can also be advantageous if two or more distance boundaries are predefined which now, so to speak, can define a floating detection region or a floating actuation region in each case as volumes. It is thus ensured that an undesired standing within the actuation region does not result in a possibly undesired triggering of the action by triggering the signal. Thus, gestures can be identified and predefined more unambiguously and distinguished from other gestures which should not trigger the action. Hereinafter a method according to the invention or an assembly module according to the invention will be briefly explained in terms of their mode of action for an example.

If the assembly module is located, for example in the rear region of the vehicle, it is used to trigger the opening intention for an automatic opening of the tailgate as a corresponding signal. For this, a monitoring of the detection region lying behind the motor vehicle takes place in a continuous manner. If the user now enters into this detection region, this is identified and an authentication step can take place previously, for example. If the user is confirmed as an authenticated user as a result of a radio key being present, for example, in his trouser pocket, a monitoring of the actuation region can now take place actively or passively. If the user or a body part of the user is determined inside the actuation region, the signal for performing the action on the motor vehicle is now triggered, namely the automatic opening of the tailgate. In other words, the user firstly enters into the detection region and must then move himself or a body part of his own accord into the actuation region in order to there trigger the desired signal for performing the action on the motor vehicle with the aid of the laser light flash in three-dimensional information structure.

According to the invention, a significantly higher security for performing the method or for the configuration of the assembly module is now achieved. Whereas in known solutions an incorrect opening could possible still occur, for example, if the user of the vehicle stands behind the vehicle with his radio key but does not have any intention of opening the tailgate. In such a case, it could occur that the user moves into the actuation region by accident and then an opening intention or the triggering intention for the action is detected in an undesired manner. By using the laser light flash according to the invention, it is now possible that 3D information allows a significantly greater restriction of the actuation region, particularly its height. An improved distinguishability between different gestures is thus possible which now significantly reduces the risk of the described incorrect triggering.

Another advantage of the assembly module according to the invention is that with the aid of the laser light flash, the fine determination with regard to the three-dimensional information is only necessary with reference to the actuation region. Thus, by means of an assembly module according to the invention it is possible to implement a two-stage method in which the laser light flash is used for the predefined actuation region, in particular not continuously but only upon identifying the user within the detection region.

A laser light flash in the sense of the present invention is understood as any form of wavelength which comes under the concept of laser light. A flash for the laser light is formed when the laser light is not emitted continuously but only for a very short time interval of preferably less than about one second. Preferably the emission of the laser light flash even takes place multiple times so that it is possible to also talk of a pulsed laser light flash. This will be explained in more detail subsequently.

It may be advantageous if, in the assembly module according to the invention, the optical sensor system is configured in the event of identifying the user in the detection region, to trigger a system for starting an authentication check between the ID transmitter and an access control system of the motor vehicle and only perform steps b) to d) in the case of a positive authentication result. This means that according to the invention, the sensor system only performs its definitive triggering steps with the aid of the laser light flash when the authorized user is actually located within the detection region. This ensures that the high energy requirement on the part of emitting a laser light flash is only implemented when the authorised person is actually located at the corresponding position in the detection region. In this embodiment it is naturally possible that the authentication step is only performed when the vehicle is locked. In an unlocked vehicle, it is accordingly possible that, for example, the passenger or a person without a radio module inside his trouser pocket triggers the corresponding action.

It is furthermore advantageous if in an assembly module according to the invention, the optical sensor system is configured to supress steps b) to c) when no user has been determined in the detection region. Alternatively to this, an allowance or execution of steps b) to c) can naturally also take place actively when the user has been detected in the detection region. In these two embodiments it is apparent that in particular the energy requirement can be reduced significantly. Thus, the necessary fine determination for the reduction of the incorrect triggering risk according to the invention is only made when a user is actually located inside the detection region. In particular in long parking situations when a vehicle is located for example for several days or weeks in an airport carpark, the low energy requirement for monitoring the detection region can now be maintained. The high energy requirements which is necessary for producing, for example, laser light flashes is avoided with this continuous monitoring and only implemented when the user has actually been identified within the detection region. This embodiment is in particular combined with the authentication check according to the preceding paragraph. This avoids that the high energy requirement for the laser light flash is implemented for every person who moves through the detection region. Thus, an even further improved reduction in the energy requirements necessary for continuous operating of the assembly module is achieved.

According to the invention, it is further advantageous if in an assembly module according to the invention, the optical sensor system has a transmitting unit for emitting a laser light flash with a wavelength in the infrared range, in particular with a wavelength in the range of 905 nm plus/minus about 10 nm. Laser light flashes having a wavelength in the infrared light range bring with them the advantage that they are not visible to the human eye. An influence of light, e.g. in a car park, is avoided in this way. This embodiment is also advantageous since an optical perception by the user is omitted and therefore the sensor system is so to speak invisible. Last, but not least, by using a laser light flash in the infrared, an independence of the ambient lighting can be achieved. The infrared range is also advantageous in this case since it can be distinguished more clearly and in particular better from the ambient scattered light or reflections from sunlight. In particular the range in which the laser light flash is emitted is implemented as the narrowest possible wavelength peak. Thus even with a broad spectrum which is perceived as total reflection by the optical sensor system, a simple and in particular computational filtering out of the emitted and reflected laser light flash can be achieved.

Likewise, energy can be saved by laser light of different wavelengths. Thus, the monitoring of the detection region until an arbitrary object is identified once in the detection region can be accomplished with light of a longer wavelength than the subsequent checking of further requirements imposed on the identification of a user. Thus, initially for example, light having a wavelength of 905 nm can be used. If an object is detected in the detection region, for example light having a wavelength of 800 nm can be used. Alternatively the wavelength can be shortened if the object changes from the far into the near zone.

A further advantage may be achieved if, in an assembly module according to the invention, the optical sensor system has at least one optical filter, in particular an infrared filter, for the optical filtering of an emitted laser light flash and/or the reflection of the laser light flash. It is preferred if this optical filter is provided exclusively in the transmitting unit or exclusively in the receiving unit. It thus becomes possible to reduce the reduction already described in the preceding paragraph in the width of the emitted peak in the wavelength spectrum of the laser light pulse. This has the result that the emitted laser light flash can then be filtered out from a wide reflection spectrum in a specific manner and in a facilitated manner and in particular computationally. Naturally, a corresponding filter can also be used in a relevant receiving unit. Since such an optical filter can reduce the width of the spectrum of the emitted laser light flash with regard to its wavelength, simpler and in particular more cost-effective light sources can be used for the laser light flash.

It is also advantageous if, in an assembly module according to the invention, the optical sensor system has at least one polarizer for the polarization of an emitted laser light flash and/or the reflection of the laser light flash. This polarizer can perform a similar function to the corresponding optical filter according to the preceding paragraph. Here also it is possible to specify the emitted laser light of the laser light flash in more detail in order to then perform an easier, faster and in particular preferably purely computation analysis for the reflected laser light of the laser light flash in a broad received reflection spectrum. The polarizer can in this case be arranged both on the transmitting unit and on the receiving unit or on both these units.

It is further advantageous if, in an assembly module according to the invention, the optical sensor system has an optical system for a broadening of the Gaussian distribution of the intensity of an emitted laser light flash in order to supply the edges of the detection region with sufficiently high intensity. By this it should be understood that a fanning out of the emitted laser light flash is preferably homogenized. Since the emission of the laser light flash involves an emission into the detection region, outer limits can be defined for this monitoring step or this agreement step. These outer limits preferably coincide with the outer limits of the predefined actuation region which has already been explained, and is smaller than the detection region. These outer limits now serve to allow a delimitation between desired actuation and non-desired actuation. The homogenization of the Gaussian distribution at these edges or these limits ensures that in the identification of the three-dimensional information by the laser light flash, this functions in a sharply delimited manner even at the edges or boundaries of the actuation region. Here it should be distinguished that this broadening of the laser light beam is of a purely geometrical nature with regard to the homogenization effect. A broadening of the width of the frequency peak is explicitly not accomplished here.

A further advantage may be achieved if, in an assembly module according to the invention, the optical sensor system has a cylindrical or substantially cylindrical design. This results in a particularly compact design which can be arranged particularly simply and easily in or on the vehicle. Preferably the cylinder axis of this design is correlated, e.g. is aligned along the emitting direction of the laser light flash or other emitting directions. This has the result that during the assembly of the assembly module and therefore also the transmitting unit, the desired and also advantageous alignment of the assembly module for the effect according to the invention can be achieved in an easy and unambiguous manner.

It is also advantageous if, in an assembly module according to the invention, the optical sensor system is configured for a superposition, in particular a complete superposition of the detection region and/or the actuation region with an emitted laser light flash. By this is to be understood that the entire detection region or preferably only the entire actuation region is superposed with the laser light flash. This ensures that the quality of the additional distance information according to the invention is present as 3D information for the entire detection region or the entire actuation region. It should again be pointed out that a corresponding transmitting unit of a sensor system preferably provides an opening cone for the emission of the laser light flash. This light cone as volume extension accordingly superimposes a relevant volume extension of an actuation volume or of the actuation region and of a detection volume or of the detection region.

It is furthermore advantageous if, in an assembly module according to the invention, the optical sensor system has a monitoring device with a transmitting unit for emitting a laser light flash, wherein the transmitting unit has an alignment with an emitting direction at an acute angle to the horizontal, in particular at an angle greater than 30°. In particular this angle is directed downwards. Since laser light flashes for such embodiments are usually used with higher intensity, the downwards alignment brings with it an increase in safety. In particular, in this way it becomes possible to use energies which in terms of magnitude define a laser class which would have a damaging effect when incident in the eye of the user. As a result of the downwards alignment of the emitting direction, the risk of entry into the human eye can be reduced significantly when using such an optical system. At the same time, an alignment is made onto an actuation region which is preferably located on the ground or in the region of the ground or just above the ground. If a side door is monitored, an optical monitoring in the region of the door handle can accordingly be made.

It is furthermore advantageous if, in an assembly module according to the invention, the optical sensor has a monitoring device for an evaluation of the time difference between the emission of a transmitted signal, in particular a laser light flash, and the identification of the reflection of the transmitted signal, in particular the laser light flash by the user, for the distance of the user from the optical sensor system. In particular, the already indicated TOF determination is used here. The time at which the laser light flash is emitted is determined. Then the time at which the reflection of the laser light flash from the user is perceived by a corresponding receiving unit of the optical sensor system is determined. The time difference between these two times can finally be determined. The time difference is used to determine the actual distance from the user by correlation with the speed of light. Thus, three-dimensional information regarding the geometric positioning of the user within the detection region or within the actuation region can be provided. Thus, in particular even precise coordinates regarding these three dimensions can be recorded for the user or the body part of the user.

If is furthermore advantageous if, in an assembly module according to the invention, the signal for performing at least one of the following actions on the motor vehicle is triggered:

opening and/or closing the tailgate of the motor vehicle
opening and/or closing a sliding door of the motor vehicle
opening and/or closing a side door of the motor vehicle
opening and/or closing a window of the motor vehicle
opening and/or closing the bonnet of the motor vehicle
opening and/or closing the filler cap of the motor vehicle
switching on and/or switching off a vehicle heater of the motor vehicle
switching on and/or switching off a heated windscreen of the motor vehicle
switching on and/or switching off a light function of the motor vehicle
folding in and/or folding out the side mirror of the motor vehicle
switching on and/or switching off an alarm of the motor vehicle
adjusting a user-specific setting in the motor vehicle, in particular a seat adjustment of the driver's seat
retracting and/or extending a trailer coupling.

The preceding list is not a definitive list. The opening and/or closing of the particular object, i.e. the tailgate, sliding door, side door, window, bonnet or a corresponding sliding roof can preferably take place automatically. Thus, for example, the user of the vehicle can now actively open or close the tailgate of the vehicle by a corresponding gesture. Also the automatic and therefore motor-driven opening and close of a sliding door or side door of the vehicle is possible according to the invention using an assembly module thus equipped. The same applies to the motor-driven movement of the window, the sliding roof, the bonnet or the filler cap. Naturally further functions of the vehicle can be covered by an action. For example, this can be a control or regulation regarding switching or and switching off a vehicle heating. A corresponding screen heater can already be switched on from outside the vehicle in winter. A light function which brings about an improved lighting in the area where the user is instantaneously located can also be switched on or off with an assembly module according to the invention. The side mirrors of the vehicle can be automatically folded in and out before or after a parking process by an assembly module according to the invention. The alarm of a motor vehicle can also be operated with an assembly module according to the invention. Last, but not least, user-specific settings such as for example the seat adjustment on the driver's seat can be adjusted in advance by an assembly module according to the invention.

A further advantage can be achieved if, in an assembly module according to the invention, the optical sensor system has a monitoring device with a detection unit for performing step a), a transmitting unit for performing step b) and an evaluation unit for performing step c). Thus, all the process steps which are performed by an optical sensor system according to the invention can be implemented by corresponding units of the monitoring device. Naturally individual units can also be formed jointly. Thus, the receiving unit and the detection unit can be formed jointly as a single and common sensor unit. The transmitting unit can also be doubled for different types of light.

An assembly module according to the preceding paragraph can be further developed in that the transmitting unit comprises at least one laser light source for emitting a laser light flash and a receiving unit for receiving a reflection of the laser light flash from the user, in particular, for the pulsed emission of a plurality of laser light flashes consecutively. Thus, a further improvement of the assembly module according to the invention is achieved since no longer only a single positioning but also detailed information regarding the three-dimensional movement of the user relative to the actuation region can be recorded. The laser light flashes can be emitted, for example, by laser light-emitting diodes. Each corresponding laser light source can comprise one or more laser light-emitting diodes. The pulsed emission is preferably accomplished at a frequency of 20 or more laser light flashes per second.

A further advantage can be achieved if the at least one laser light source is arranged next to the receiving unit. In particular in the case of several laser light sources these are all distributed uniformly or around the receiving unit. Thus, a uniform illumination can be achieved. Preferably a close proximity between the transmitting unit and the receiving unit is formed so that in the already described TOF measurement the angle between the emitting direction and the receiving direction of the transmitting unit and the receiving unit is negligible.

It may furthermore be advantageous if, in an assembly module according to the invention, the transmitting unit is configured to emit a laser light flash along at least two emitting directions which meet at a focal point which is located inside the detection region, in particular inside an actuation region. These laser light flashes can accordingly each be emitted with reduced energy so that the required energy for the desired reflection work is only achieved at the focal point within the detection region. This focal point can be provided in point form or as a volume element which is formed inside the detection region. Preferably such a volume element of the focal point is smaller or the same as the actuation region in the form of an actuation volume.

It is also advantageous if in an assembly module according to the invention, the laser light flash is emitted into the actuation region which is configured to be smaller than the detection region inside the detection region. Thus, the actuation region is correlated with the laser light flash so that in unnecessary regions of the detection region, no further three-dimensional fine monitoring with the laser light flash is required. This in particular reduces the necessary energy requirement in that the laser light flash is now used restrictedly for the exclusively required actuation region.

The subject matter of the invention is also a method for triggering a signal for performing an action on a motor vehicle, comprising the following steps:

a) monitoring a detection region lying outside the motor vehicle in order to determine the proximity of a user,
b) performing a measurement of the distance from the user within the detection region and
c) in the case of identifying the user in a predefined actuation region within the detection region triggering a signal for performing an action on the motor vehicle.

A method according to the invention is in particular configured for operating in an assembly module according to the invention. Accordingly, a method according to the invention brings with it the same advantages as have been explained in detail with reference to the assembly module according to the invention. Preferably the following substeps are executed for step b):

b1) emitting a laser light flash within the detection region and b2) identifying a reflection of the laser light flash from the user.

Further advantages, features and details are obtained from the following description in which exemplary embodiments of the invention are described in detail with reference to the drawings. The features mentioned in the claims and the description can be essential to the invention in each case individually for themselves or in any combination. In the figures shown schematically:

Elements having the same function and mode of action are designated with the same reference numbers in the figures.

Figure 1:
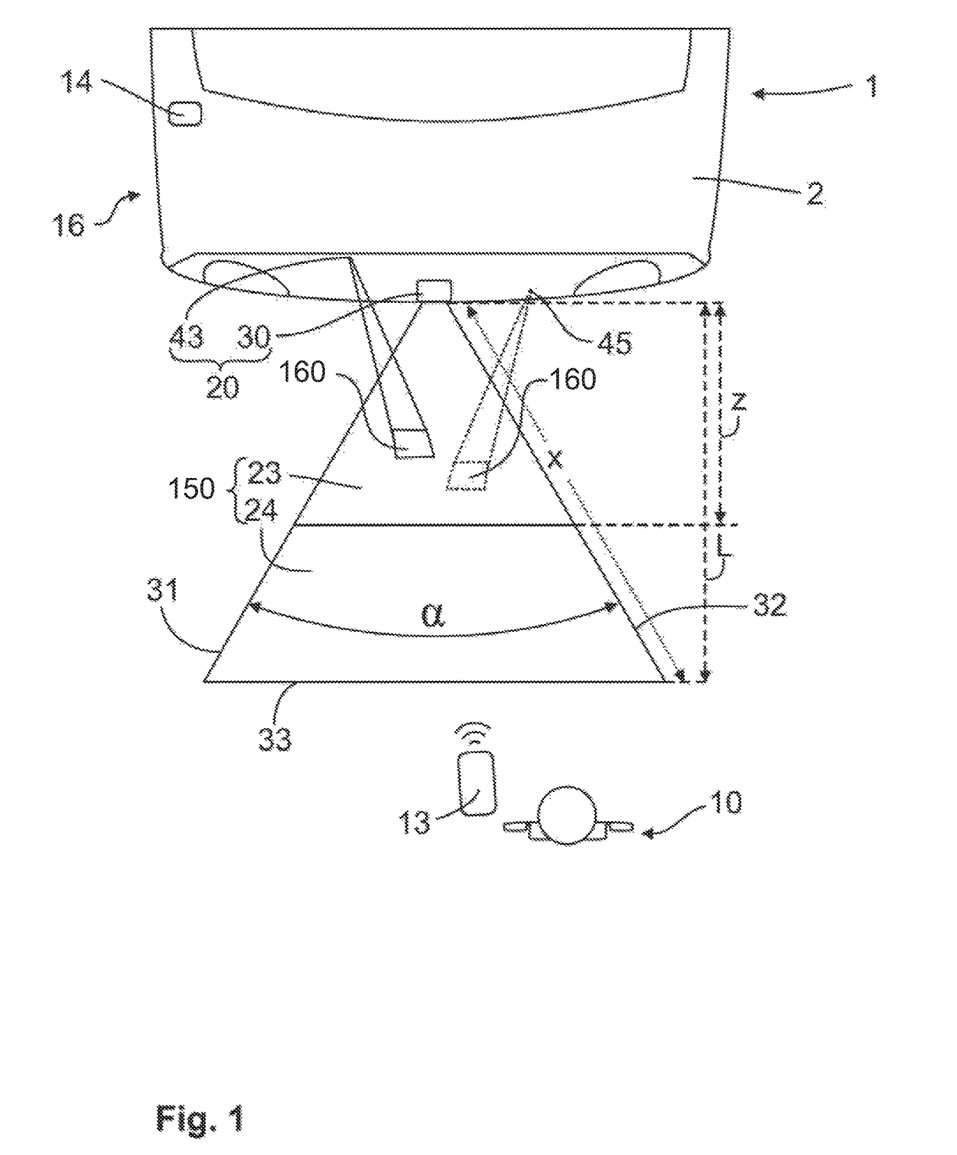
FIG. 1 shows a plan view of a rear region of a motor vehicle with an assembly module according to the invention and an authentication system according to the invention.
Figure 2:
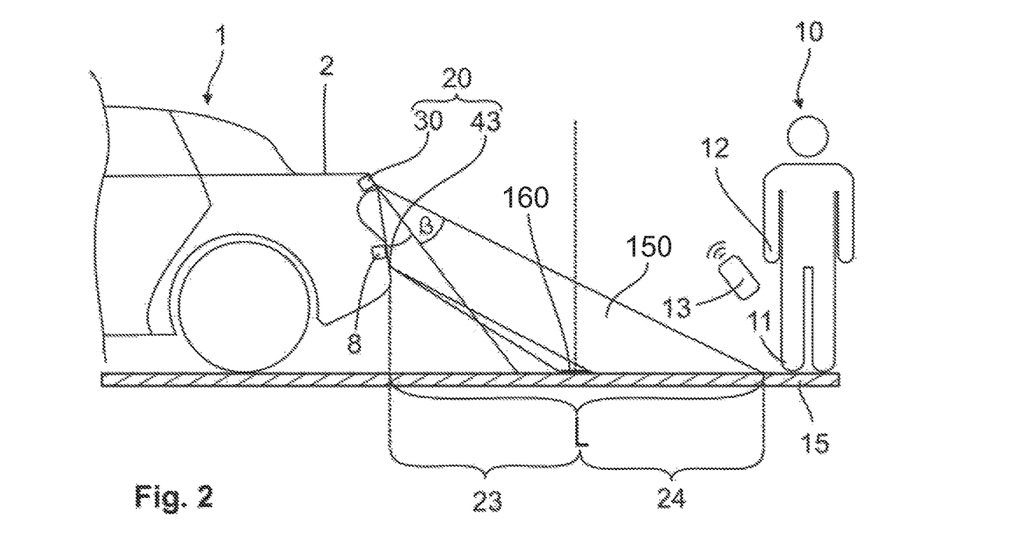
FIG. 2 shows the rear region from FIG. 1 in a side view.
Figure 3:
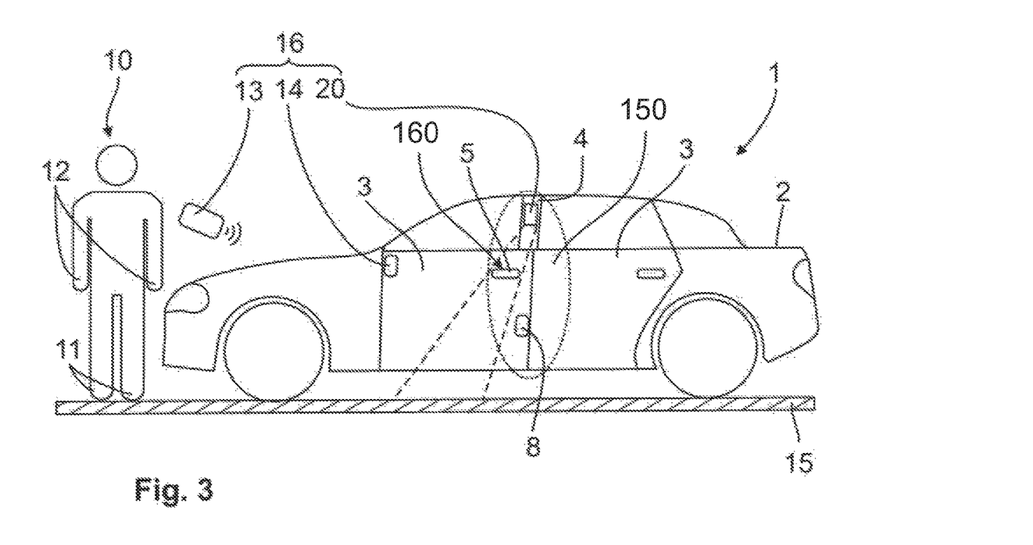
FIG. 3 shows a side region of a motor vehicle with an assembly module according to the invention and an authentication system according to the invention in a side view.
Figure 4:
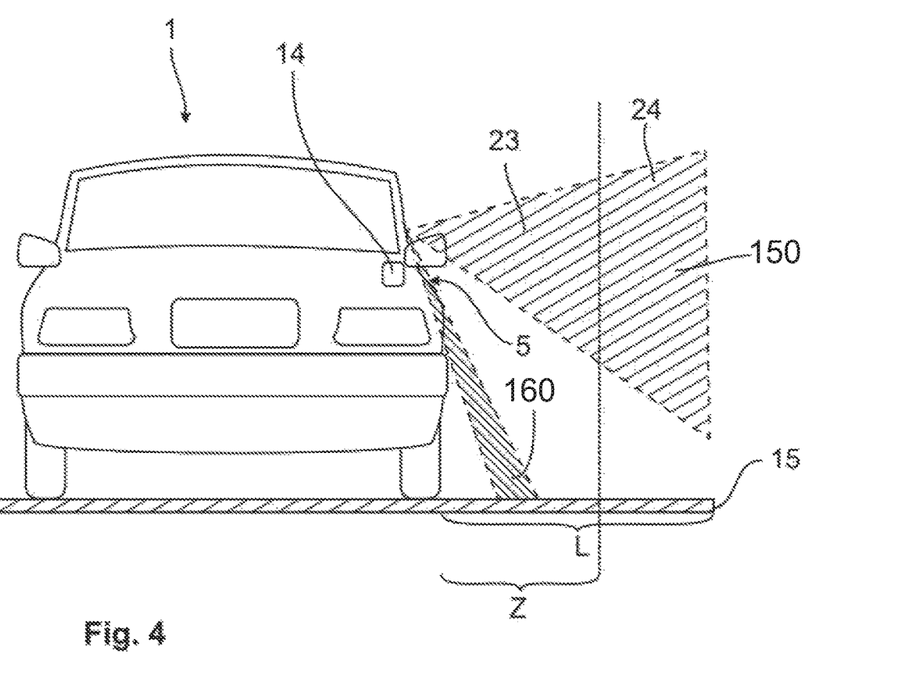
FIG. 4 shows the assembly module from FIG. 3 in another side view.

FIGS. 1 and 2 on the one hand and FIGS. 3 and 4 on the other hand each show how an assembly module 20 according to the invention and an authentication system 16 according to the invention are used in a motor vehicle 1. FIGS. 1 and 2 here show the use in a rear region of a motor vehicle 1 with a tailgate 2. The optical sensor system 30 of the assembly module 20 is disposed in the region of the tailgate 2, e.g. in a handle strip of the tailgate 2. A detection region 150 lying outside the motor vehicle 1 is produced by the optical sensor system 30. The optical sensor system 30 monitors the detection region 150 permanently when the motor vehicle 1 is parked. When a user 10, who is shown outside the detection region 150 in FIGS. 1 and 2, approaches the motor vehicle 1 and the optical sensor system 30 with an ID transmitter 13, the user 10 enters into the detection region 150. If the user 10 is identified in the detection region 150, preferably a signal for starting an authentication check is triggered.

Since the optical sensor system 30 identifies that a user 10 is approaching the motor vehicle 1, and in the case of identifying the user 10 in the detection region 150, a signal for starting an authentication check is triggered, the user need not be active to initiate the authentication check. Thus, the user 10 need not hold the ID transmitter 13 in a hand but it is sufficient to carry the ID transmitter 13, for example, in a pocket. This therefore involves a passive keyless entry check.

Since the optical sensor system 30 monitors the detection region 150, it can on the one hand be ensured that the signal for starting the authentication check is triggered before the user 10 reaches the motor vehicle 1. In this case, the authentication check is usually completed before the user 10 has come closer to the motor vehicle 1 than an actuation region 160. On the other hand, the detection region 150 is restricted to a predefined spatial section, which for example, comprises only a few $m^2$ in a plan view so that the signal for starting the authentication check is only triggered rarely. As a result, the signal for starting the authentication check can be triggered in good time and specifically.

In a plan view the detection region 150 has two legs 31, 32 which approach towards the optical sensor system 30. The detection region 150 also has a base 33 which delimits the detection region 21 on the side of the detection region 21 facing away from the optical sensor system 30. The detection region 21 ends on the base 33. The base 33 is configured as a straight line. The two legs 31, 32 form an angle $\alpha$. As a result of the detection region 150 tapering in the direction of the motor vehicle 1, the timely and nevertheless rare triggering of the signal for starting an authentication can be achieved particularly effectively.

The angle $\alpha$ in FIG. 1 is between 30° and 60°. This prevents a user 10 who passes the motor vehicle 1 at the side from entering into the detection region 150. A length L obtained from the distance of the base 33 from the optical sensor system 30 is 1.5 m. As a result of the length L and the angle $\alpha$, x is also obtained as the maximum distance of a point of the detection region 150 from the optical sensor system 30. The detection region 150 is delimited by the selected parameters so that only a small amount of electrical power is required for monitoring the detection region 150. As shown in FIG. 2, the detection region 150 ends on a ground surface 15 on which the motor vehicle 1 is stopped. As a result, the detection region 150 comprises an oblique truncated cone. An angle $\beta$ mapped in FIG. 2 corresponds to an angle of the detection region 21 in a side view. In the present case the angle $\alpha$ is selected to be different from the angle $\beta$ so that the detection region 150 is configured elliptically.

Another possibility for requiring only a small amount of electrical power is achieved by dividing the detection region 150 into a far zone 24 and a near zone 23, where the near zone 23 has a shorter distance from the sensor system 30 than the far zone 24. If the user 10 initially enters into the far zone 24, the optical sensor system 30 determines that an object is located in the far zone 24. The optical sensor system 30 further checks whether the object has a predefined size. If the object has the predefined size and the object enters into the near zone 23 of the detection region 150, from a measurement of the distance of the object from an optical sensor 50 in the near zone 23 it is additionally concluded whether the object approaches the optical sensor. If this is confirmed, the user 10 is identified and a signal for starting an authentication check between the ID transmitter 13 and an access control system 14 of the motor vehicle 1 is triggered.

By means of the signal, the access control system 14 is caused to send a wake-up signal to the ID transmitter 13. The ID transmitter 13 then transmits an authentication code to the access control system 14. The access control system 14 compares the authentication code with a stored code. If both codes agree, the authentication is successful and an unlocking signal is triggered. This can be an unlocking signal for all the doors of the motor vehicle 1 or however only one unlocking signal for the tailgate 2.

FIGS. 1 and 2 further show the first actuation region 160. After a successful authentication, the optical sensor system 30 monitors the first actuation region 160. If the user 10 makes a predefined movement in the first actuation region 160 and for example, treads into the first actuation region 160 with a foot 11 for a certain time and within a predefined maximum actuation duration, a operating signal is triggered.

The operating signal comprises a signal for opening the tailgate 2. Here it can only be the case that a door lock 8 of the tailgate 2 is unlocked and jumps slightly due to the pressure of a seal. On the other hand, it is feasible that at the same time a motor-driven opening aid is activated by the operating signal so that the tailgate 2 opens completely.

The actuation region 160 is preferably formed visibly on the ground surface 15. For this purpose in this embodiment a first display element 43 is provided that makes the actuation region 160 visible to the user 10. To this end the first display element 43 can emit visible light. The first display element 43 is triggered after the successful authentication. In FIGS. 1 and 2 the first actuation region 160 lies within the near zone 23 of the detection region 150. The actuation region 160 has smaller spatial dimensions that the detection region 150.

It can be the case that the first actuation region 160 is the only actuation region. Optionally, and therefore shown by the dashed line in FIG. 1, a second actuation region 160 is additionally shown. In this case, a user 10 must execute a predefined movement in both actuation regions 160 within a predefined actuation duration in order to provide the operating signal. A second display element 45 of the assembly module 20 is used to make the second actuation region 160 visible.

FIGS. 3 and 4 show another exemplary embodiment as to how the assembly module 20 according to the invention is used. Insofar as this is not explained in the following, the operating mode and function of the assembly module 20 shown in FIGS. 3 and 4 corresponds to the operating mode and function of the assembly module 20 shown in FIGS. 1 and 2. The assembly module 20 in FIGS. 3 and 4 is disposed in a B pillar 4 of a motor vehicle side. An approach to a side door 3 of the motor vehicle 1 is monitored by the detection region 150. The operating signal can be used for opening the side door 3. The predefined movement for providing the operating signal can be a predefined movement with a hand 12 of the user 10 in the region of door handle 5.

In contrast to the exemplary embodiment in FIGS. 1 and 2, in the exemplary embodiment shown in FIGS. 3 and 4 the detection region 150 lying outside the motor vehicle 1 is located completely above the ground surface 15. The detection region 150 has a flat ground surface. The actuation region 160 of the exemplary embodiment of FIGS. 3 and 4 comprises the region of the door handle 5. The only actuation region 160 lies outside the detection region 150.

Figure 5:
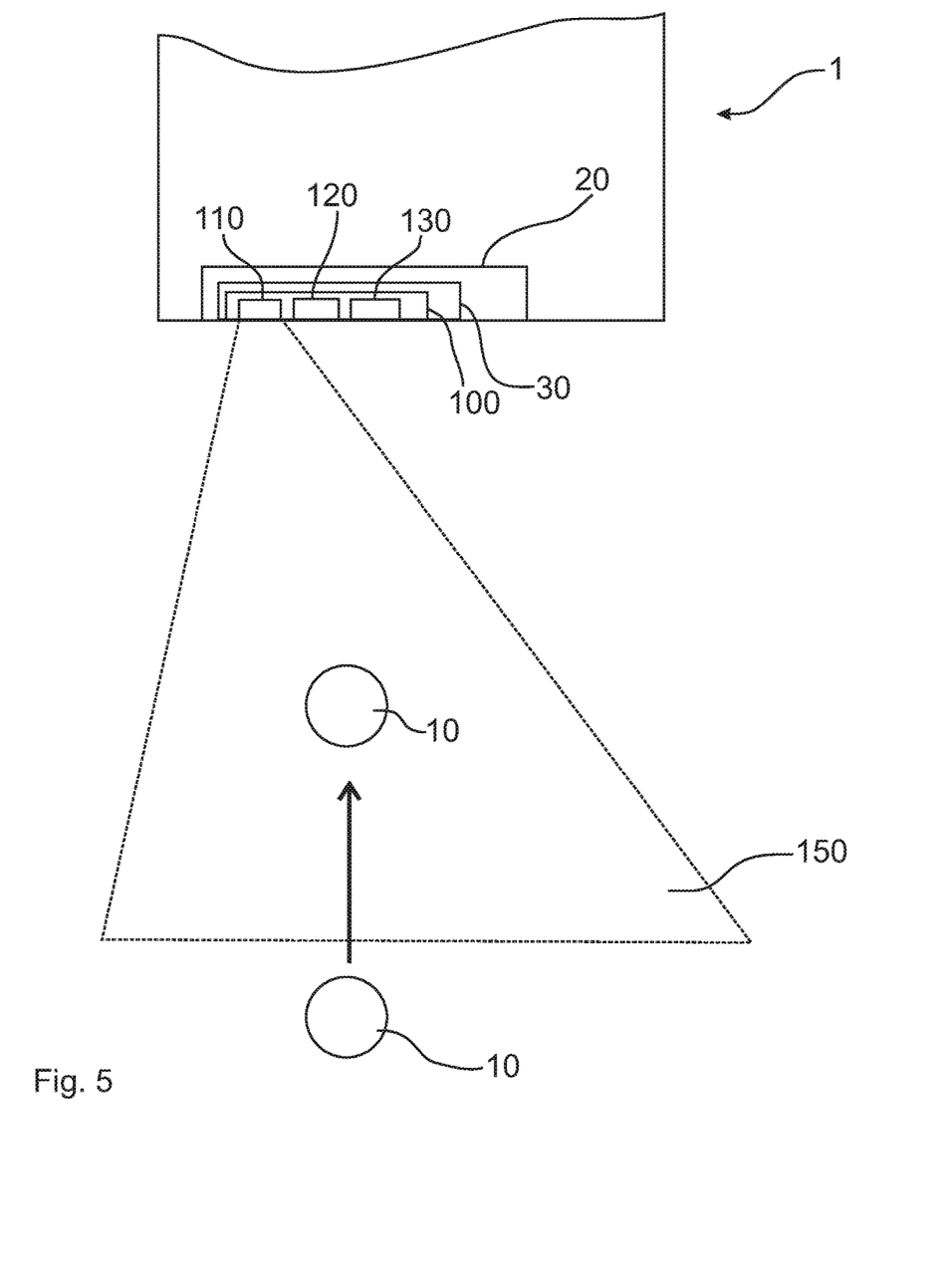
FIG. 5 shows an embodiment of an assembly module according to the invention.

FIG. 5 shows an embodiment of an assembly module 20 according to the invention which is arranged in a motor vehicle 1 on the rear side. This assembly module 20 is fitted with a monitoring device 100 which is part of an optical sensor system 30. The monitoring device 100 of this embodiment has a detection unit 110, a transmitting unit 120 and a receiving unit 130.

The detection unit 110 is capable of monitoring the detection region 150 located at the rear behind the motor vehicle 1. For this, the detection unit 110, for example, has a photosensor. Additional transmitting units 120 for monitoring the detection region by artificial light are also possible in order to achieve a corresponding independence of the ambient lighting. Pulsed light flashes can already be used here.

According to the invention, a transmitting unit 120 for emitting a laser light flash 122 can additionally be provided now. The process steps to be carried out, which are possible using an assembly module 20 according to the invention are now explained in detail with reference to FIGS. 5 and 6.

It can be seen in FIG. 5 how a user 10 enters into the detection region 150, for example, with a body part or completely. Since the detection region 150 is monitored substantially continuously by the detection unit 110, the optical sensor system 30 identifies this movement of the user 10 with the aid of the monitoring device 100. Now, the laser light flash 122 can be emitted, preferably in a two-stage method in order to achieve additional position information for the user 10. Here a correlation of the position of the user 10 with an actuation region 160 is now possible. In this case, the laser light flash 120 is preferably emitted with an emitting direction 124 which overlaps the actuation region 160 or illuminates this exactly with a homogeneous intensity distribution.

Figure 6:
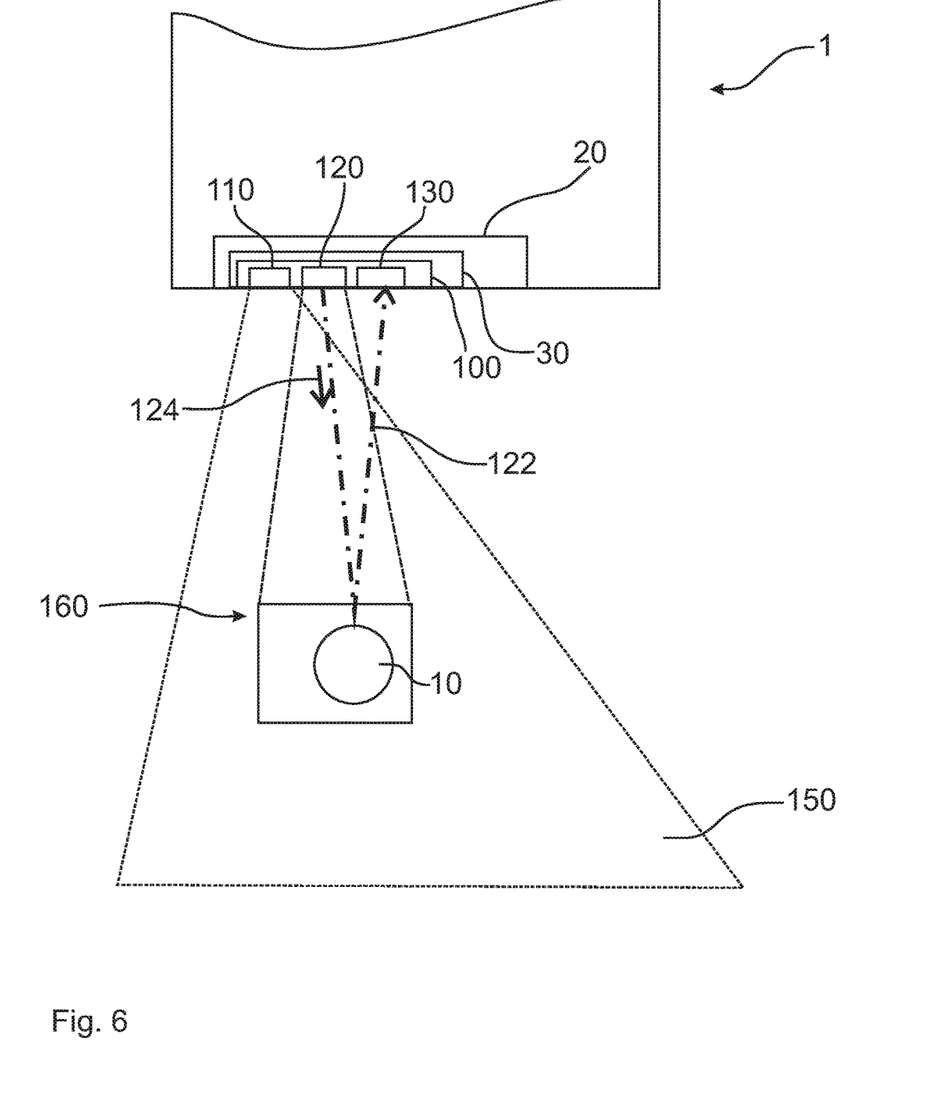
FIG. 6 shows the embodiment of FIG. 5 with a user inside the actuation region.

As can be deduced from FIG. 6, the laser light flash 122 is reflected at least partially by the user 10. The reflected light of the laser light flash 122 can now be received and evaluated by a receiving unit 130. An evaluation is made in particular on the basis of the so-called TOF measurement so that now additional distance information is available for more accurate positioning of the user 10 with a correlation to the actuation region 160.

Since according to FIG. 6, the user 10 has now been identified within the actuation region 160, a signal can be triggered for performing an action on the motor vehicle 1. This can involve, for example, the opening of the tailgate or a lateral sliding door of the motor vehicle 1.

Figure 7:
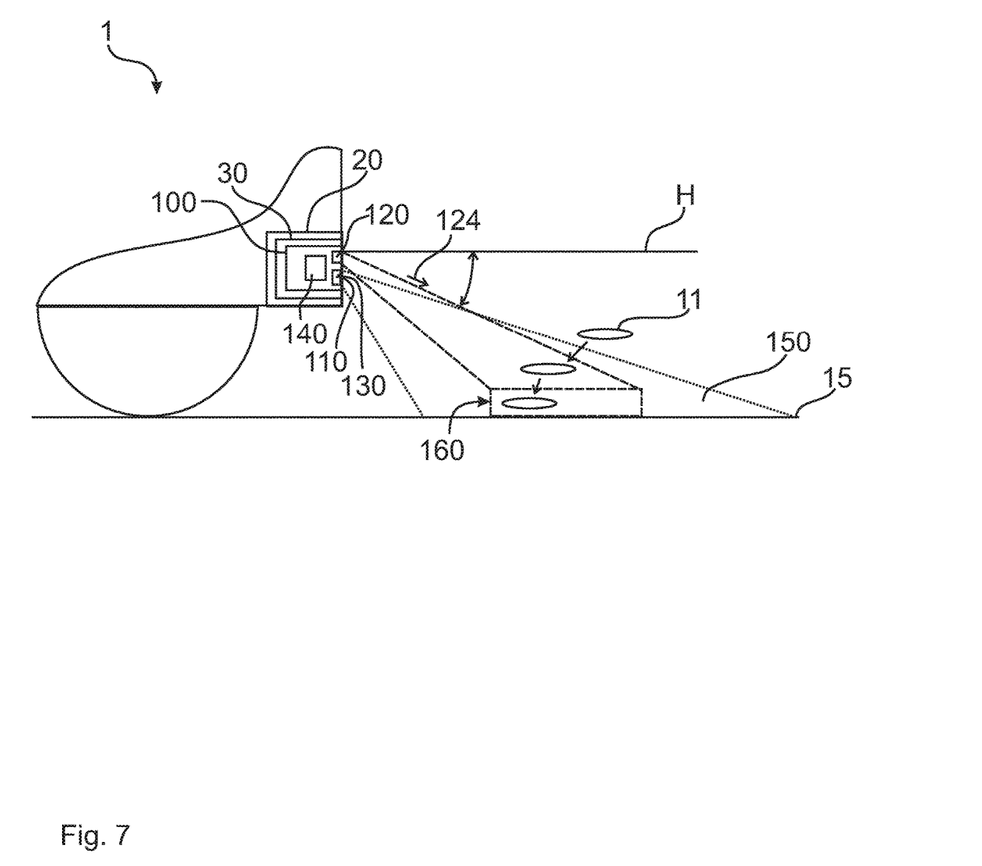
FIG. 7 shows another embodiment of an assembly module according to the invention.

FIG. 7 shows schematically in a side view a further embodiment of an assembly module 20 according to the invention. This is fitted with an optical system 30 which again comprises a monitoring device 100. Here it can be clearly identified that the transmitting unit 120 is located above the detection unit 110, where the detection unit 110 here also forms the receiving unit 130 in a functional union. For performing the individual process steps, in particular the evaluation, the monitoring device 100 of this embodiment has another evaluation unit 140.

It can be clearly seen from FIG. 7 that volume information regarding the detection region 150 or the actuation region 160 can now be monitored by means of the fine position determination with the aid of the laser light flash 122. The movement of a foot 11 of a user 10 is shown here. If the foot 11 of the user 10 moves along the three depicted positions, it firstly penetrates into the volume of the detection region 150. Only at this time, preferably in the two-stage method, the pulsed laser light flashes 122 are emitted along the emitting direction 124 until it is identified that the foot 11 of the user 10 is now located in the volume of the actuation region 160. Now the signal for performing an action on the motor vehicle can be triggered.

It can be further identified that according to FIG. 7, an angle is formed between the horizontal H and the emitting direction 124 of the laser light flash 122 which points downwards at an acute angle. Thus, a monitoring from top to bottom is possible so that a risk of injury to the human eye can preferably even be completely eliminated.

Figure 8:
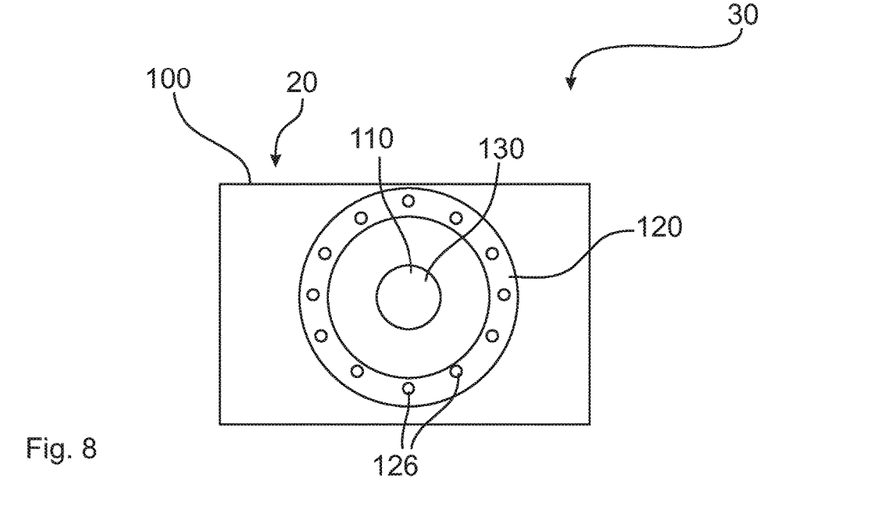
FIG. 8 shows another embodiment of an assembly module according to the invention and FIG. 9 shows another embodiment of an assembly module according to the invention.

FIG. 8 shows an embodiment of an assembly module 20 according to the invention in which the transmitting unit 120 comprises a plurality of laser light sources 126. These individual laser light sources 126 are arranged annularly and uniformly distributed around the receiving unit 130 which here also forms the detection unit 110. This results in a particularly uniform light distribution in relation to the emission of the laser light flash 122. At the same time, by reducing the distance between the distance between the transmitting unit 120 and the receiving unit 130, it is possible to have a negligible angle for the subsequent assessment using the TOF method.

Figure 9:
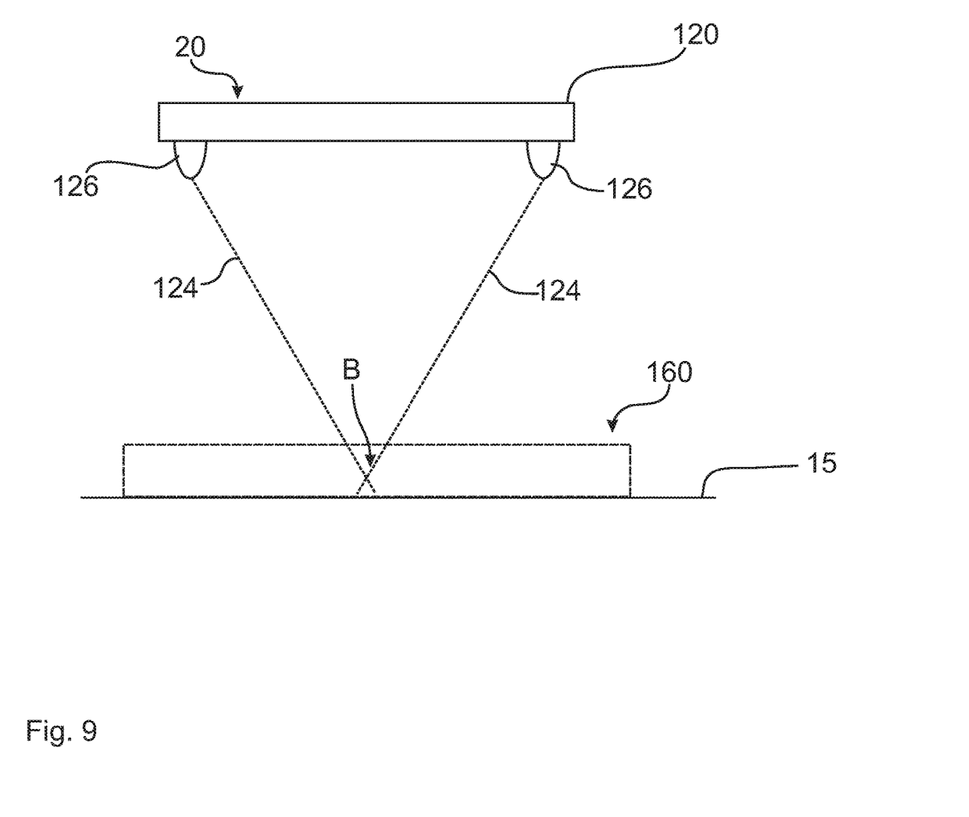

FIG. 9 shows another embodiment of an assembly module 20 according to the invention. Here a plurality of laser light sources 126 are formed at a distance from one another for the transmitting unit 120. This results in a plurality of emitting directions 124, here shown schematically two, which have a focal point B within the actuation region 160. This has the result that the individual laser light sources 126 can be operated with reduced energy since the corresponding energy density for the desired reflection at a user 10 is only provided at the focal point B. In addition to the energy requirement, this also reduces the risk of damage, e.g. to the human eye, since the high energy density is only achieved at the focal point B. It should be pointed out here that the focal point B can also be formed as a volume element inside the actuation region 160.

The preceding explanation of the embodiments only describes the present invention within the framework of examples. Naturally individual features of the embodiments, if technically meaningful, can be freely combined without departing from the scope of the present invention.

REFERENCE LIST

1 Motor vehicle
2 Tailgate
3 Side door
4 B-pillar
5 Door handle
8 Door lock
10 User
11 Foot
12 Hand
13 ID transmitter
14 Access control system
15 Ground surface
16 Authentication system
20 Assembly module
23 Near zone
24 Far zone
30 Optical sensor system
31 leg of detection region
32 leg of detection region
33 Base
43 First display element
45 Second display element
100 Monitoring device
110 Detection unit
120 Transmitting unit
122 Laser light flash
124 Emitting direction
126 Laser light source
130 Receiving unit
140 Evaluation unit
150 Detection region
160 Actuation region
α Angle between the two sides of the detection region
β Angle
H Horizontal
B Focal point
L Length
x Maximum distance of a point of the detection region

The invention claimed is:

1. An assembly module for a motor vehicle comprising: an optical sensor system comprising at least one optical sensor, wherein the optical sensor system is configured a) for monitoring a detection region lying outside the motor vehicle in order to determine the proximity of a user by the assembly module, wherein monitoring the detection region is performed by one of the at least one optical sensor,
b) for measuring the distance to the user within the detection region by the assembly module, wherein measuring the distance is performed by one of the at least one optical sensor, and
c) in the case of identifying the user in a predefined actuation region within the detection region, triggering a signal for performing an action on the motor vehicle, wherein by the measurement of the distance to the user a volume of the actuation region is monitored, to ensure that body parts of the user above the actuation region do not lead to triggering of the signal, to avoid an incorrect triggering, wherein the measurement of the distance to the user provides additional information in a third dimension to a two-dimensional monitoring of the detection region, so that the measurement of the distance to the user allows, starting from a two-dimensional detection region, the volume of the actuation region to be monitored in the third dimension, wherein three-dimensional information regarding the geometric positioning of the user within the actuation region is provided.

2. The assembly module according to claim 1, wherein
the optical sensor system is configured to perform step b) by means of an ultrasound measurement.

3. The assembly module according to claim 1, wherein the optical sensor system is configured to perform step b) by means of a radar measurement.

4. The assembly module according to claim 1, wherein
the optical sensor system is configured to perform step b) by means of an evaluation of at least two images of the detection region recorded at different angles.

5. The assembly module according to claim 1, wherein
the optical sensor system is configured to perform the following two substeps for step b), namely
b1) emitting a laser light flash within the detection region and
b2) identifying a reflection of the laser light flash by the user.

6. The assembly module according to claim 1, wherein
the optical sensor system is configured in the case of identifying the user in the detection region to trigger a signal for starting an authentication check between an ID transmitter and an access control system of the motor vehicle and steps b) to d) are only executed in the case of a positive authentication process.

7. The assembly module according to claim 1, wherein
the optical sensor system is configured to suppress steps b) to c) when no user has been determined in the detection region.

8. The assembly module according to claim 1, wherein
the optical sensor system has a transmitting unit for emitting a laser light flash with a wavelength in the infrared range, in particular with a wavelength in the range of 905 nm+/−about 10 nm.

9. The assembly module according to claim 8, wherein
the optical sensor system has at least one optical filter, in particular an infrared filter, for the optical filtering of at least an emitted laser light flash or the reflection of the laser light flash.

10. The assembly module according to claim 8, wherein
the optical sensor system has at least one polarizer for at least the polarization of an emitted laser light flash or the reflection of the laser light flash.

11. The assembly module according to claim 8, wherein
the optical sensor system has an optical system for a broadening of the Gaussian distribution of the intensity of an emitted laser light flash in order to supply the edges of the detection region with sufficiently high intensity.

12. The assembly module according to claim 1, wherein
the optical sensor system has a cylindrical or substantially cylindrical design.

13. The assembly module according to claim 8, wherein
the optical sensor system is configured for a superposition, in particular a complete superposition of at least the detection region or the actuation region with an emitted laser light flash.

14. The assembly module according to claim 1, wherein
the optical sensor system has a monitoring device with a transmitting unit for emitting a laser light flash, wherein the transmitting unit has an alignment with an emitting direction at an acute angle to the horizontal, in particular at an angle greater than 30°.

15. The assembly module according to claim 1, wherein
the optical sensor system has a monitoring device for an evaluation of the time difference between the emission of a transmitted signal, in particular a laser light flash and the identification of the reflection of the transmitted signal, in particular the laser light flash by the user for the distance of the user from the optical sensor system.

16. The assembly module according to claim 1, wherein
the signal for performing at least one of the following actions on the motor vehicle is triggered:
 at least opening or closing the tailgate of the motor vehicle
 at least opening or closing a sliding door of the motor vehicle
 at least opening or closing a side door of the motor vehicle
 at least opening or closing a window of the motor vehicle
 at least opening or closing the bonnet of the motor vehicle
 at least opening or closing the filler cap of the motor vehicle
 at least switching on or switching off a vehicle heater of the motor vehicle
 at least switching on or switching off a heated windscreen of the motor vehicle
 at least switching on or switching off a light function of the motor vehicle
 at least folding in or folding out the side mirror of the motor vehicle
 at least switching on or switching off an alarm of the motor vehicle
 adjusting a user-specific setting in the motor vehicle, in particular a seat adjustment of the driver's seat
 at least retracting or extending a trailer coupling.

17. The assembly module according to claim 1, wherein
the optical sensor system has a monitoring device with a detection unit for performing step a), a transmitting unit for performing step b) and an evaluation unit for performing step c).

18. The assembly module according to claim 17, wherein
the transmitting unit comprises at least one laser light source for emitting a laser light flash and a receiving unit for receiving a reflection of the laser light flash from the user, in particular for the pulsed emission of a plurality of laser light flashes consecutively.

19. The assembly module according to claim 18, wherein
the at least one laser light source is arranged next to the receiving unit.

20. The assembly module according to claim 17, wherein
the transmitting unit is configured to emit a laser light flash along at least two emitting directions which meet at a focal point which is located inside the detection region, in particular inside an actuation region.

21. The assembly module according to claim 1, wherein
the laser light flash is emitted into the actuation region which is configured to be smaller than the detection region inside the detection region.

22. A method for triggering a signal for performing an action on a motor vehicle, comprising the following steps:
 a) monitoring, using an optical sensor, a detection region lying outside the motor vehicle in order to determine the proximity of a user,
 b) performing, using the optical sensor, a measurement of the distance from the user within the detection region, and
 c) in the case of identifying the user in a predefined actuation region within the detection region triggering a signal for performing an action on the motor vehicle,
 wherein by the measurement of the distance to the user a volume of the actuation region is monitored, to ensure that body parts of the user above the actuation region do not lead to triggering of the signal, to avoid an incorrect triggering, wherein the measurement of the distance to the user provides additional information in a third dimension to a two-dimensional monitoring of the detection region, so that the measurement of the distance to the user allows, starting from a two-dimensional detection region, the volume of the actuation region to be monitored in the third dimension, wherein three-dimensional information regarding the geometric positioning of the user within the actuation region is provided, and
 wherein
 said method is for operating in an assembly module for the motor vehicle, wherein the assembly module comprises an optical sensor system comprising at least one optical sensor, wherein the optical sensor system is configured
 a) for monitoring the detection region lying outside the motor vehicle in order to determine the proximity of the user by the assembly module, wherein monitoring the detection region is performed by one of the at least one optical sensor,
b) for measuring the distance to the user within the detection region by the assembly module, wherein measuring the distance is performed by one of the at least one optical sensor, and
c) in the case of identifying the user in the predefined actuation region within the detection region, triggering the signal for performing the action on the motor vehicle.

23. The method according to claim 22, wherein
for step b), the following two substeps are performed:
b1) emitting a laser light flash within the detection region and
b2) identifying a reflection of the laser light flash from the user.

24. The assembly module according to claim 1, wherein the activation region within the detection region is smaller than the detection region, and is configured for determining an approach of the user by permanent monitoring of the detection region, and to provide monitoring within the detection region which is selectively performed when the user has been identified in the detection region.

25. The assembly module according to claim 1, wherein
step a) and step b) are performed by the same optical sensor, and the optical sensor system is configured in the case of identifying the user in the detection region to trigger a signal for starting an authentication check between an ID transmitter and an access control system of the motor vehicle and steps b) to d) are only executed in the case of a positive authentication process.

26. The method according to claim 22, wherein the optical sensor system is configured to perform step b) by an evaluation of at least two images of the detection region recorded at different angles.

\* \* \* \* \*